(12) United States Patent
Hubbard et al.

(10) Patent No.: US 8,554,428 B2
(45) Date of Patent: Oct. 8, 2013

(54) CVT CONTROL SYSTEM HAVING VARIABLE POWER SOURCE SPEED

(75) Inventors: Milton Carter Hubbard, Naperville, IL (US); Brian Douglas Hoff, East Peoria, IL (US); Mark Edward Rettig, East Peoria, IL (US); Steven James Juricak, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 759 days.

(21) Appl. No.: 11/905,309

(22) Filed: Sep. 28, 2007

(65) Prior Publication Data
US 2009/0088936 A1    Apr. 2, 2009

(51) Int. Cl.
G06F 7/00    (2006.01)
G06F 17/00    (2006.01)
G06F 19/00    (2006.01)

(52) U.S. Cl.
USPC .............................................. 701/54; 701/51

(58) Field of Classification Search
USPC ..................................................... 701/54, 51
See application file for complete search history.

(56) References Cited

U.S. PATENT DOCUMENTS

| | | |
|---|---|---|
| 4,005,577 A | 2/1977 | Haumaier |
| 5,048,638 A | 9/1991 | Duncan et al. |
| 5,344,370 A | 9/1994 | Luyckx |
| 5,406,483 A | 4/1995 | Kallis et al. |
| 5,526,261 A | 6/1996 | Kallis et al. |
| 5,947,861 A * | 9/1999 | Nobumoto ...................... 477/37 |
| 6,181,020 B1 * | 1/2001 | Uchida et al. ............... 290/40 C |
| 6,203,463 B1 | 3/2001 | Casey et al. |
| 6,260,440 B1 | 7/2001 | Cronin et al. |
| 6,343,470 B1 | 2/2002 | Nanri et al. |
| 6,371,882 B1 | 4/2002 | Casey et al. |
| 6,424,902 B1 | 7/2002 | Kuras |
| 6,457,382 B2 | 10/2002 | Cronin et al. |
| 6,480,767 B2 * | 11/2002 | Yamaguchi et al. ............ 701/22 |
| 6,485,391 B2 * | 11/2002 | Makiyama et al. ............ 477/44 |
| 6,505,111 B1 * | 1/2003 | Tange et al. ..................... 701/96 |
| 6,616,559 B1 | 9/2003 | Hori et al. |
| 6,703,463 B2 | 3/2004 | Holguin et al. |

(Continued)

FOREIGN PATENT DOCUMENTS

| | | |
|---|---|---|
| CN | 1972833 | 5/2007 |
| DE | 10350308 | 5/2005 |

(Continued)

OTHER PUBLICATIONS

U.S. Appl. No. 11/711,760, filed Feb. 28, 2007, "Machine System Having Task-Adjusted Economy Modes," pp. 1-18, Figs. 1-3.

(Continued)

*Primary Examiner* — Thomas Tarcza
*Assistant Examiner* — Imran Mustafa
(74) *Attorney, Agent, or Firm* — Finnegan, Henderson, Farabow, Garrett & Dunner LLP

(57) ABSTRACT

A powertrain control system is disclosed. The powertrain control system may have a power source and a CVT coupled to an output of the power source. The powertrain control system may further have a controller in communication with the power source and the CVT. The controller may have a map with a plurality of speed modes, and, for at least one of the plurality of speed modes, the controller may be configured to vary an actual power source speed based on at least one of a CVT output speed or a ground speed.

20 Claims, 3 Drawing Sheets

(56) References Cited

U.S. PATENT DOCUMENTS

| | | |
|---|---|---|
| 7,192,374 B2 | 3/2007 | Kuras et al. |
| 7,210,293 B2 | 5/2007 | Fukasawa et al. |
| 7,217,216 B2 | 5/2007 | Inoue |
| 7,469,761 B2 * | 12/2008 | Kuras et al. ............... 180/65.245 |
| 2002/0017413 A1 * | 2/2002 | Ochiai et al. .................. 180/178 |
| 2002/0024306 A1 * | 2/2002 | Imai et al. ...................... 318/34 |
| 2002/0132699 A1 * | 9/2002 | Bellinger ...................... 477/107 |
| 2004/0058769 A1 * | 3/2004 | Larkin .............................. 475/5 |
| 2005/0277501 A1 | 12/2005 | Kuras et al. |
| 2006/0234822 A1 | 10/2006 | Morscheck et al. |

FOREIGN PATENT DOCUMENTS

| | | |
|---|---|---|
| EP | 1439337 | 7/2004 |
| FR | 2812249 | 2/2002 |
| JP | 63266264 A | 11/1988 |
| JP | 63266266 A | 11/1988 |
| JP | 2003182398 | 7/2003 |

OTHER PUBLICATIONS

U.S. Appl. No. 11/882,234, filed Jul. 31, 2007, "Machine with Task-Dependent Control," pp. 1-17, Figs. 1-6.

* cited by examiner

CVT CONTROL SYSTEM HAVING VARIABLE POWER SOURCE SPEED

TECHNICAL FIELD

The present disclosure relates generally to a control system for a machine with a CVT transmission and, more particularly, to a control system for varying a power source speed based on a CVT output speed.

BACKGROUND

Machines such as, for example, on-highway vocational vehicles, off-highway haul trucks, wheel loaders, motor graders, and other types of heavy machinery are used for a variety of tasks. These machines generally include a power source, which may embody, for example, an engine, such as a diesel engine, a gasoline engine, or a gaseous fuel-powered engine that provides the power required to complete these tasks. The power produced by the power source may be transmitted through a transmission, such as, for example, a continuously variable transmission ("CVT"), to one or more ground engaging devices in order to propel the machine.

Machine control systems are often used to coordinate and regulate operation of the power source and CVT to improve the machine's responsiveness and efficiency. For example, while the machine is traveling the power source and CVT may have a range of speeds and torques at which the power source and CVT experience substantially stable and efficient operation. Operating outside of this range may increase fuel consumption and/or decrease responsiveness.

One method for controlling a power source and CVT is disclosed in U.S. Pat. No. 7,192,374 (the '374 patent) issued to Kuras et al. on Mar. 20, 2007. The '374 patent discloses an engine underspeed control system that adjusts the transmission ratio so that the engine is running at an optimal speed condition (i.e., within a range of speeds where the engine is operating most efficiently). The control system of the '374 patent discloses an operator input that provides an input signal to a controller. The operator input, for example, could be an accelerator pedal that allows the operator to depress the pedal to request an increase in machine output speed. The input signal may represent a requested speed, which the controller then converts into a motor speed command (the motor being a component of a CVT that is powered by an engine). The control system of the '374 patent prevents the motor speed command from exceeding an upper speed limit and from dropping below a lower speed limit. These limits are calculated such that, as long as the motor speed command remains within the upper and lower speed limits, the motor torque command will stay within the torque capability of the motor. The motor torque limit at a particular motor speed can be determined from the torque-speed curves for the motor. The engine underspeed control algorithm (implemented by the controller) will also reduce the motor speed command if the engine begins lugging (e.g., if the engine speed drops below a threshold value). The method of the '374 patent thus enables the CVT to respond quickly to changes in the motor speed command while preventing damage to the motor and transmission.

Although the machine of the '374 patent may help the motor remain responsive while preventing potential damage to the motor and transmission, it may not provide for efficient operation and control of the engine under all conditions. By only controlling the motor speed, the control system of the '374 patent may allow the engine to operate at an inefficient and/or unresponsive engine speed (i.e., either too low or too high) for the presently occurring transmission gear ratio, work implement conditions, and load conditions.

The disclosed machine system is directed to overcoming one or more of the problems set forth above.

SUMMARY OF THE DISCLOSURE

In one aspect, the present disclosure is directed to a powertrain control system. The powertrain control system may include a power source and a CVT coupled to an output of the power source. The powertrain control system may further include a controller in communication with the power source and the CVT. The controller may include a map with a plurality of speed modes, and, for at least one of the plurality of speed modes, the controller may be configured to vary an actual power source speed based on at least one of a CVT output speed or a ground speed.

In another aspect, the present disclosure is directed to a method of machine control. The method may include generating a rotational output and directing the rotational output to drive a CVT. The method may further include measuring a CVT output speed and varying an actual speed of the rotational output based on the measured CVT output speed. Varying the actual speed may occur when implementing at least one of a plurality of speed modes.

DETAILED DESCRIPTION

Figure 1:
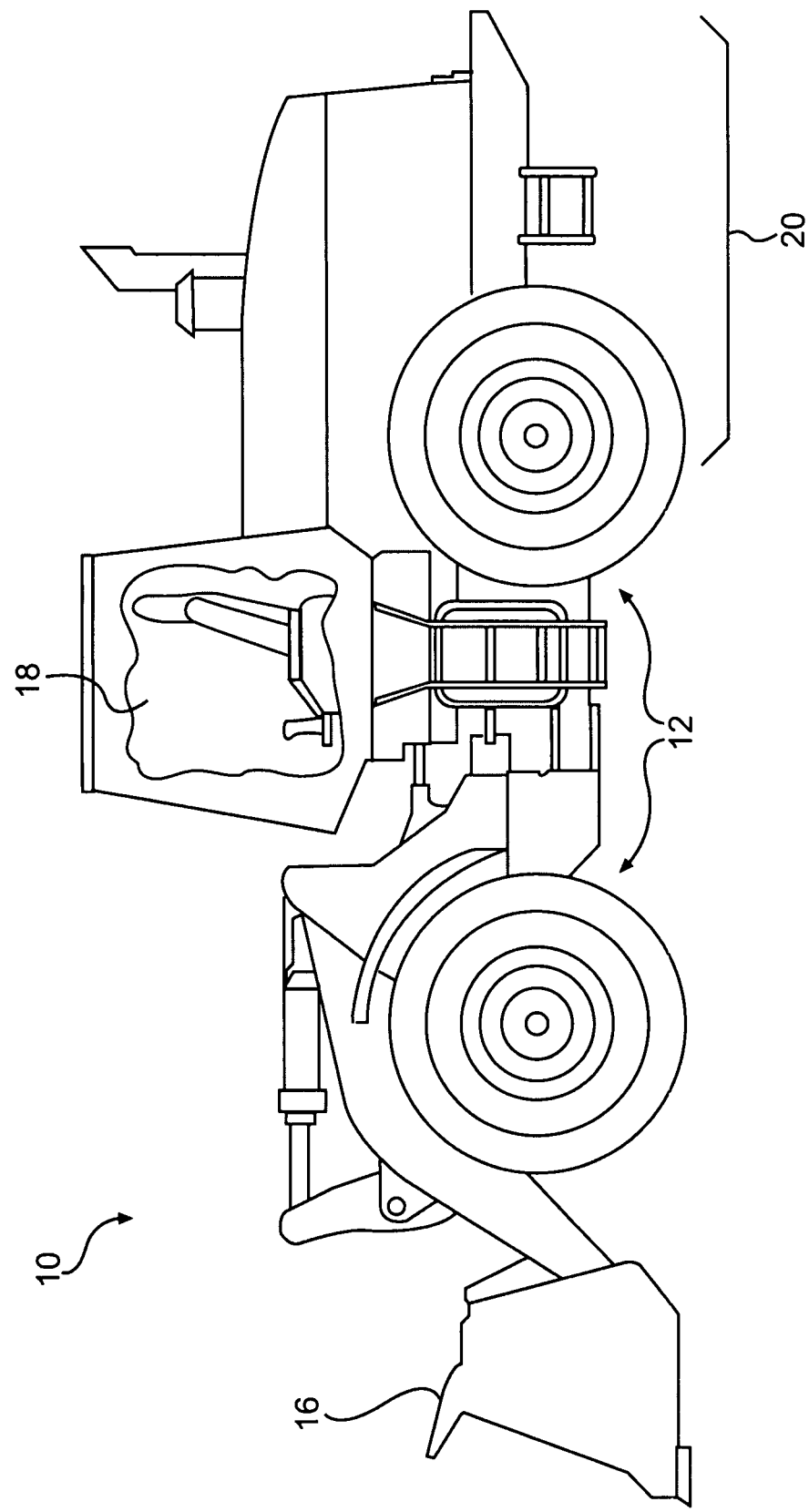
FIG. 1 is a diagrammatic illustration of an exemplary disclosed machine.

FIG. 1 illustrates an exemplary machine 10. Machine 10 may be a mobile vehicle that performs some type of operation associated with an industry such as mining, construction, farming, transportation, or any other industry known in the art. For example, machine 10 may be an earth moving machine, such as a wheel loader, an excavator, a backhoe, a motor grader, or any other suitable earth moving machine known in the art. Alternatively, machine 10 may be a load carrying vehicle, a marine vessel, a passenger vehicle, or any other suitable operation-performing machine. Machine 10 may include one or more traction devices 12, a work implement 16, an operator station 18, and a powertrain 20.

Traction devices 12 may include one or more wheels located on each side of machine 10 (only one side shown) configured to allow translational motion of machine 10. Alternatively, traction devices 12 may include tracks, belts, or other traction devices known in the art. Any of traction devices 12 may be driven and/or steerable.

Work implement 16 may include any device used to perform a particular task, such as, for example, a bucket, a blade, a shovel, a ripper, a hammer, a grappling device, or any other task-performing device known in the art. One or more work implements 16 may be attachable to machine 10 and controllable from operator station 18. Work implement 16 may be connected to machine 10 via a direct pivot or a linkage system and may be actuated via one or more hydraulic actuators, electric motors, or in any other appropriate manner. Work implement 16 may pivot, rotate, slide, swing, lift, or move relative to machine 10 in any manner known in the art.

Operator station 18 may be a location from which an operator controls machine 10. Operator station 18 may be located onboard or offboard of machine 10 and may include an operator input device 22 (see FIG. 2) for controlling one or more components of powertrain 20. Operator input device 22 may be located proximal an operator seat and may embody a single or multi-axis joystick, a wheel, a knob, a push-pull device, a button, a pedal, or any other input device known in the art. It is contemplated that operator station 18 may include additional operator input devices, such as, for example, a steering device, a braking device, a gear ratio selection device, and/or other operator input devices known in the art.

Figure 2:
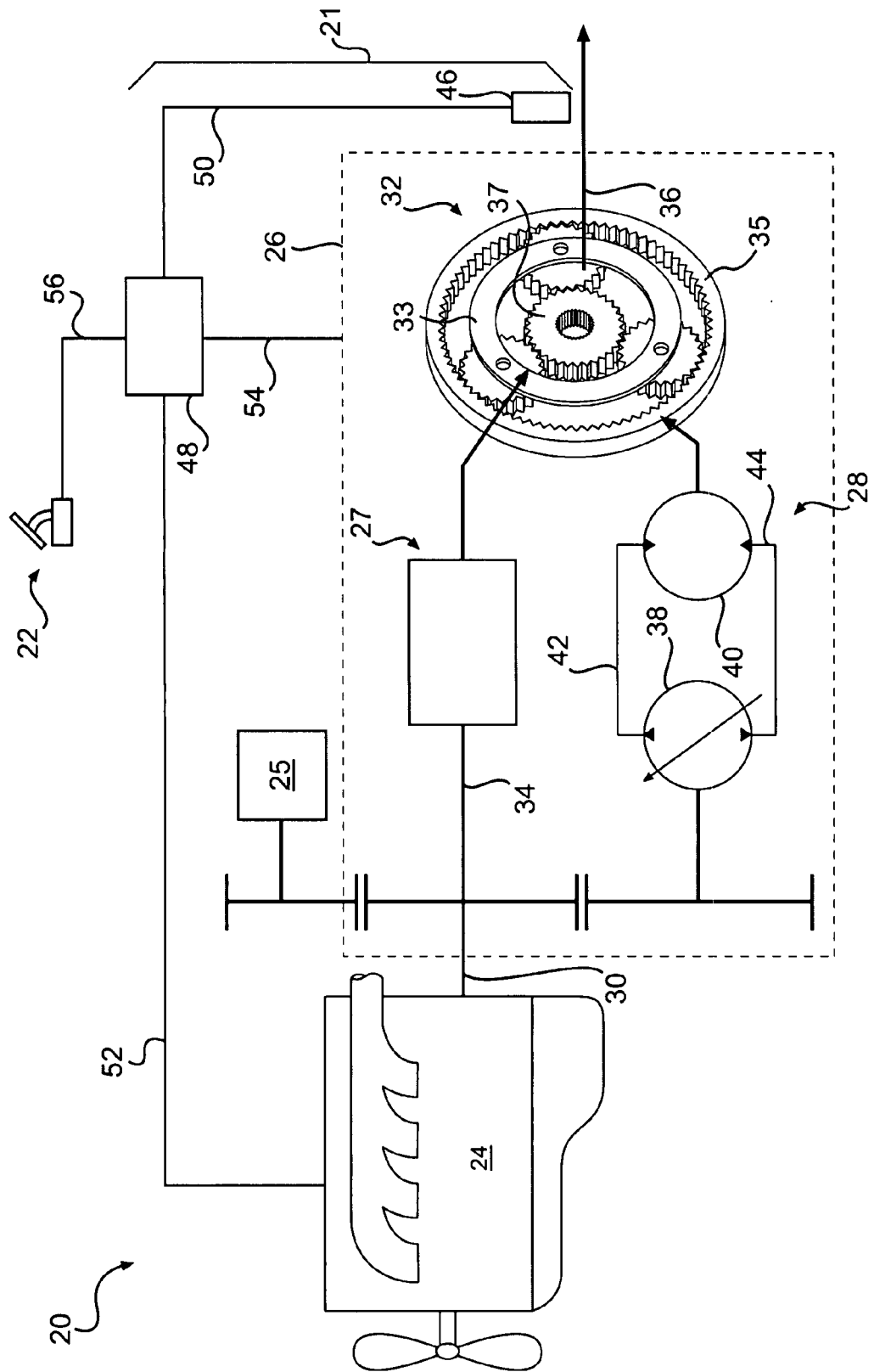
FIG. 2 is a schematic and diagrammatic illustration of an exemplary disclosed powertrain and control system that may be used with the machine of FIG. 1.

As shown in FIG. 2, powertrain 20 may include components that work together to propel machine 10. Specifically, powertrain 20 may include a power source 24 drivingly coupled to a continuously variable transmission ("CVT") 26. It is contemplated that powertrain 20 may also include a torque converter (not shown) to couple power source 24 and CVT 26.

Power source 24 may provide power output for the operation of machine 10 (referring to FIG. 1). Power source 24 may embody a combustion engine, such as a diesel engine, a gasoline engine, a gaseous fuel powered engine (e.g., a natural gas engine), or any other type of combustion engine known in the art. Power source 24 may alternatively embody a non-combustion source of power, such as a fuel cell or a power storage device coupled with an electric motor. Power source 24 may provide a rotational output to drive traction device 12 (see FIG. 1), thereby propelling machine 10. Power source 24 may also provide a rotational output to power a hydraulic circuit 25 used for actuating work implement 16.

CVT 26 may include multiple subcomponents (or power flow paths) that transmit rotational power from an output 30 of power source 24 to traction device 12. The subcomponents may include, for example, a mechanical transmission 27 and a hydrostatic transmission 28. It is contemplated that mechanical transmission 27 and hydrostatic transmission 28 may act in parallel, as shown in FIG. 2, or in series.

Mechanical transmission 27 of CVT 26 may embody, for example, a multi-speed, bidirectional, mechanical transmission with a plurality of forward gear ratios, one or more reverse gear ratios, and one or more clutches (not shown). Mechanical transmission 27 may selectively actuate the clutches to engage predetermined combinations of gears (not shown) to produce a discrete output gear ratio. Mechanical transmission 27 may be an automatic-type transmission, wherein shifting is based on a power source speed, a maximum operator selected gear ratio, and a shift map stored within a controller. Alternatively, mechanical transmission 27 may be a manual transmission, wherein the engaged gear is manually selected by an operator.

Hydrostatic transmission 28 may include a pump 38 and a motor 40 interconnected by way of a first fluid passageway 42 and a second fluid passageway 44. Pump 38 may embody, for example, a variable displacement pump rotated by output 30 of power source 24 to pressurize fluid. Pump 38 may direct the pressurized fluid through fluid passageways 42 or 44 to motor 40, thus creating a subsequent rotation of motor 40. A "gear ratio" or "effective gear ratio" of hydrostatic transmission 28 may be altered by varying the displacement of pump 38. It is contemplated that within the operational limits of pump 38, the fluid displacement of pump 38 may be infinitely varied (i.e., any fluid displacement within the operational limits of pump 38 may be achievable), thus creating an infinite number of effective gear ratios. Hydrostatic transmission 28 may alternatively embody an electric continuously variable transmission, a roller-based continuously variable transmission, or a pulley-based continuously variable transmission.

The outputs of mechanical transmission 27 and hydrostatic transmission 28 may be combined using one or more gear assemblies 32 (only one shown in FIG. 2) disposed between mechanical and hydrostatic transmission 27, 28 and a mechanical output 36. Gear assemblies 32 may include, for example, planetary gear assemblies. Each gear assembly 32 may have, for example, a carrier 33, a ring gear 35, and an sun gear 37. Sun gear 37 may be connected to mechanical output 36, which may be coupled to traction device 12. Mechanical transmission 27 may be connected to carrier 33 and hydrostatic transmission may be connected to ring gear 35. It is contemplated that a parallel configuration may alternatively be created by locating either hydrostatic transmission or mechanical transmission 27 on an output side of gear assemblies 32 (i.e., coupled to mechanical output 36) and then connecting a path of output 30 directly into gear assemblies 32 (e.g., if mechanical transmission 27 is located on the output end of gear assemblies 32, a path of output 30 may be connected to carrier 33).

A combined gear ratio may be achieved by varying the discrete gear ratio of mechanical transmission 27 and the effective gear ratio of hydrostatic transmission 28, thus changing the input and output torque and speed characteristics of CVT 26. For example, the speed at which ring gear 35 rotates relative to a ground, and the speed at which carrier 33 rotates relative to ring gear 35, may determine a rotational speed of sun gear 37.

A control system 21 may monitor and modify the performance of machine 10 and its components. In particular, control system 21 may include a speed sensor 46 and a controller 48. Controller 48 may communicate with speed sensor 46 via a communication line 50, with power source 24 via a communication line 52, with CVT 26 via a communication line 54, and with operator input device 22 via a communication line 56. It is contemplated that controller 48 may also communicate (not shown) with hydraulic circuit 25 and/or other components of machine 10.

Speed sensor 46 may be located to sense a rotational speed of mechanical output 36 (i.e., the CVT output speed). Speed sensor 46 may embody, for example, a magnetic pick up sensor, a rotary encoder, a tachometer, or any other type of sensor configured to produce a corresponding signal. Speed sensor 46 may be disposed proximal a shaft associated with mechanical output 36 or proximal any other component of machine 10 whose rotational speed is related to the CVT output speed (e.g., an axle, a wheel, a gear).

Controller 48 may embody a single microprocessor or multiple microprocessors that include a means for controlling an operation of machine 10. Numerous commercially available microprocessors may be configured to perform the functions of controller 48, and it should be appreciated that controller 48 may readily embody a general machine microprocessor capable of controlling numerous machine functions. Controller 48 may include a memory, a secondary storage device, a processor, and any other components for running an application. Various other circuits may be associated with controller 48, such as, for example, power supply circuitry, signal conditioning circuitry, data acquisition circuitry, signal output circuitry, signal amplification circuitry, and other types of circuitry known in the art.

Figure 3:
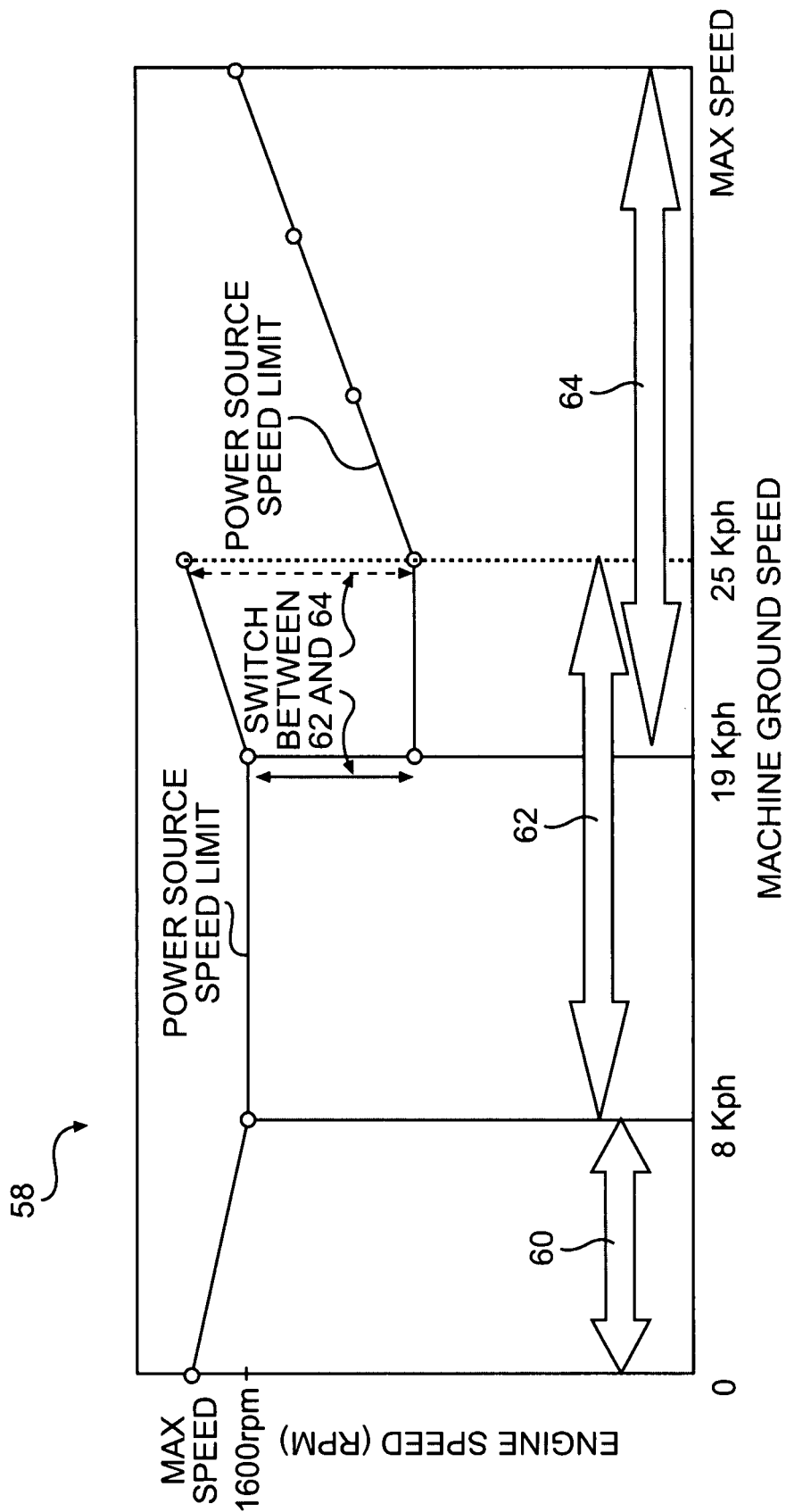
FIG. 3 is a graph of an exemplary map for controlling the powertrain of FIG. 2.

Controller 48 may include one or more maps stored within an internal memory of controller 48. Each of these maps may include a collection of data in the form of tables, graphs, and/or equations. As shown in FIG. 3, controller 48 may include at least one map 58 usable for controlling a power source speed limit (i.e., maximum speed of the power source rotational output) as a function of the CVT output speed and/or machine ground speed (CVT output speed and machine ground speed may both be measurable or calculable using the signal received from speed sensor 46, and CVT output speed may be readily converted to machine ground speed, or vice versa). It is contemplated that the actual (or current) power source speed may be may be below, but not above the power source speed limit. Map 58 may specify the power source speed limit for a plurality of speed modes, such as, for example, a low-speed mode 60, a mid-speed mode 62, and a high-speed mode 64. The speed modes may be directly related to machine ground speed and/or CVT output speed. For example low, mid and high-speed modes 60, 62, and 64 may relate to ground speeds of approximately 0-8, 8-25, and 19-40 kilometers per hour, respectively (the speed modes may also be expressed in terms of CVT output speed). It is contemplated that when using, for example, low-speed mode 60 or mid-speed mode 62, controller 48 may allow modulation of the actual power source speed up to, but not exceeding the power source speed limit. It is further contemplated that in at least one speed mode, such as, for example, high-speed mode 64, controller 48 may control the actual power source speed (or power source speed command) based on the CVT output speed. For example, controller 48 may give an engine speed command to force an actual power source speed to the power source speed limit (operator no longer directly controls the actual power source speed with operator input device 22). Thus, in high-speed mode 64, operator input device 22 may control an output torque of CVT 26. It is contemplated that each speed range may be optimized to maximize the efficiency and responsiveness of machine 10.

In low-speed mode 60 and when machine ground speed is about 0 kph, the power source speed limit may be set at a maximum rated power source speed, such as, for example, approximately 1700 rpm. Maximizing the power source speed limit at a machine ground speed of 0 kph may create a potential for increased hydraulic fluid flow in hydraulic circuit 25. In low-speed mode 60, a trend of the power source speed limit may generally decrease as the machine ground speed increases until it reaches approximately 1600 rpm at a speed of 8 kph. If the actual power source speed is tracking the power source speed limit, it is contemplated that controller 48 may increase the machine travel speed while the decreasing the actual power source speed (for a single discrete gear ratio) by modifying the effective gear ratio of hydrostatic transmission 28. For example, if the operator has fully actuated operator input device 22 (e.g., pedal is completely depressed), thus causing the actual power source speed to track the power source speed limit, controller 48 may increase the machine travel speed while simultaneously decreasing the power source speed by changing the rotational speed of ring gear 35 (via pump 38) at a faster rate than the rotational speed of carrier gear 33 is changing. Controller 48 may continuously adjust the effective gear ratio of hydrostatic transmission 28 independently of the currently selected discrete gear ratio to create any combined gear ratio that achieves a specified power source speed trajectory (e.g., increasing, decreasing, or constant power source speed as a function of machine ground speed) or meets another predetermined control objective of controller 48 (e.g., specified propulsion, specified torque, specified fuel efficiency, and/or specified power available for work implement operation).

In mid-speed mode 62, the power source speed limit may be set at a substantially constant level, such as, for example, approximately 1600 rpm. The power source speed limit of 1600 rpm may help achieve single-function work implement cycle times. The machine travel speed at which controller 48 switches from mid-speed mode 62 to high-speed mode 40 (thus switching between the power source speed limits used in each speed mode) may depend on the acceleration of machine 10 and/or a degree of operator input device actuation (e.g., amount of pedal depression). It is contemplated that the machine acceleration may be calculated from speed sensor measurements or other appropriate means.

For example, when machine 10 is experiencing light acceleration and/or a small amount of operator input device actuation, controller 48 may switch from mid-speed mode 62 to high-speed mode 64 at a lower machine ground speed (e.g., approximately 19 kph). Alternatively, when machine 10 is experiencing high acceleration and/or a large amount of operator input device actuation, controller 48 may switch from mid-speed mode 62 to high-speed mode 64 at a higher machine ground speed (e.g., of approximately 25 kph). This delay of switching from the power source speed limit of mid-speed mode 62 to the power source speed limit of high-speed mode 64 may allow increased fuel efficiency and machine propulsion under the heavy acceleration conditions. The power source speed limit of the section of mid-speed mode 62 used during high acceleration conditions (e.g., section from approximately 19-25 kph) may increase from approximately 1600 rpm at 19 kph to approximately 1700 rpm at 25 kph.

In high-speed mode 64, when machine 10 is experiencing light acceleration and/or a small amount of operator input device actuation (e.g., the section from approximately 19-25 kph), the actual power source speed may be set at a substantially constant level, such as, for example, approximately 1300 rpm. In the upper section of high-speed mode 64 (e.g., section from approximately 25-40 kph), the power source speed limit may increase as a function of ground speed. The power source speed limit may have an increasing trajectory to offset the loss characteristics of CVT 26, which may increase as a function of machine ground speed. It is contemplated that the power source speed limit may increase to a value of approximately 1700 rpm at 40 kph. It is further contemplated that the power source speed limit may continue to increase at the same rate for speeds above 40 kph or, alternatively, may plateau at 1700 rpm. All increases and/or decreases of the power source speed limit in low, mid, and high-speed modes 60, 62, and 64 may be approximately linear or defined by any other appropriate trajectory.

Each speed range in map 58 may be related to one discrete gear ratio of mechanical transmission 27. For example, low-speed mode 50 may relate to a first discrete gear ratio, mid-speed mode 62 may relate to a second discrete gear ratio, and high-speed mode 64 may relate to a third discrete gear ratio. It is contemplated controller 48 may switch between the plurality of speed modes in map 58 based on the machine travel speed, the currently selected discrete gear ratio, or both.

INDUSTRIAL APPLICABILITY

The disclosed control system may be applicable to any machine where power source control is desired. The disclosed control system may modify a power source speed limit as a function of ground speed to reduce fuel consumption while maximizing machine propulsion. The operation of control system 21 will now be described.

In one example, an operator of machine 10 may actuate operator input device 22, thus requesting machine motion. Operator input device 22 may send the operator request via communication line 56 to controller 48 and controller 48 may convert the signal to a requested power source speed and power source torque. Controller 48 may then reference the requested power source speed with map 58 to ensure that that the requested power source speed does not exceed the power source speed limit. Controller 48 may set the actual power source speed to the requested power source speed up to but not exceeding the power source speed limit of low-speed mode 60.

During machine operation, controller 48 may continuously communicate with speed sensor 46 to determine the machine ground speed and/or CVT output speed. When the machine ground speed reaches approximately 8 kph, controller 48 may switch from the power source speed limit of low-speed mode 60 to the power source speed limit of mid-speed mode 62. At the transition from low-speed mode 60 to mid-speed mode 62, controller 48 may also command a switch from the first discrete gear ratio to the second discrete gear ratio.

While implementing mid-speed mode 62, the operator may continue to freely modulate the actual power source speed up to but not exceeding the power source speed limit. When the machine ground speed of approximately 19 kph is reached, controller 48 may communicate with speed sensor 46. Controller 48 may use information from speed sensor 46 to determine if machine 10 is accelerating. Controller 48 may also communicate with operator input device 22 to determine the degree of operator input device actuation. If machine 10 is above a threshold acceleration and/or operator input device 22 is above a threshold amount of actuation, controller 48 may continue to use the power source speed limit of mid-speed mode 62 until a higher machine ground speed is reached, such as, for example, 25 kph. Alternatively, if machine 10 is below a threshold acceleration and/or operator input device 22 is below a threshold amount of actuation, controller 48 may switch to the power source speed limit of high-speed mode 64 at approximately 19 kph. It is contemplated that at the transition from mid-speed mode 62 to high-speed mode 64, controller 48 may command a switch from the second discrete gear ratio to the third discrete gear ratio.

While implementing high-speed mode 64, controller 48 may force an actual power source speed to the power source speed limit, such that operator input device 22 may only control the output torque of CVT 26. It is contemplated, however, that the entire power source speed limit curve may scale up or down (e.g., entire curve on FIG. 3 that represents the power source speed limit of high-speed mode 64 may move up or down) depending on a load carried or experienced by machine 10. For example, an increase in machine load (e.g., caused by usage of work implement 16) may cause the entire power source speed limit curve to scale up, and a decreased load may cause it to scale down. Controller 48 may stay in high-speed mode 64 until the machine ground speed decreases to the ground speed ranges associated with either mid-speed mode 62, or low-speed mode 60.

Several advantages of the disclosed control system may be realized. In particular, the disclosed control system may increase productivity and responsiveness by allowing the operator to control the actual power source speed at lower ground speeds to allow for increased flow for the pump associated with the work implement. However, the controller may force the actual power source speed to the power source speed limit at higher speeds to ensure maximum efficiency and propulsion. Additionally, the power source speed limit may vary as a function of machine ground speed or CVT output speed to accommodate for the particular loss characteristics of the power source and CVT combination.

It will be apparent to those skilled in the art that various modifications and variations can be made to the disclosed control system without departing from the scope of the invention. Other embodiments of the control system will be apparent to those skilled in the art from consideration of the specification and practice of the control system disclosed herein. For example, any alternative CVT may be used in place of the disclosed CVT, and all speed ranges may be related to virtual discrete gear ratios. It is intended that the specification and examples be considered as exemplary only, with a true scope being indicated by the following claims and their equivalents.

What is claimed is:

1. A powertrain control system associated with a power source and a CVT coupled to an output of the power source, comprising:
a controller in communication with the power source and the CVT,
wherein the controller includes a map with a plurality of speed modes including at least a first speed mode and a second speed mode, the controller being configured to transition from the first speed mode to the second speed mode as a result of a ground speed exceeding a threshold speed, the map including a power source speed limit for the plurality of speed modes, wherein the power source speed limit of the first speed mode varies as a function of ground speed for a constant machine load,
the power source speed limit of the first speed mode for a constant machine load having:
a first value at zero ground speed, and
a second value at a ground speed greater than zero, wherein the first value is greater than the second value,
wherein for the first speed mode, the controller is configured to:
allow direct modulation of an actual power source speed up to, but not above, the power source speed limit via an operator input device.

2. The powertrain control system of claim 1, wherein the controller is configured to scale the power source speed limit up based on an increase in the machine load.

3. The powertrain control system of claim 2, wherein the controller includes a third speed mode having a power source speed limit, and the power source speed limit of the third speed mode increases as a function of increasing ground speed at a constant machine load, a power source speed limit of the second speed mode staying constant as a function of increasing ground speed at a constant machine load.

4. The powertrain control system of claim 3, wherein the controller is configured to vary the actual power source speed directly as a function of the ground speed when the controller implements the third speed mode.

5. The powertrain control system of claim 4, wherein the operator input device is configured to control an output torque of the CVT when the controller implements the third speed mode.

6. The powertrain control system of claim 5, wherein the controller is configured to transition from the second speed mode to the third speed mode as a result of the ground speed exceeding a second threshold speed, wherein the controller is configured to set the second threshold speed at one of a lower threshold speed or an upper threshold speed as a function of at least one of a machine acceleration or a degree of operator input device actuation.

7. The powertrain control system of claim 1, wherein the CVT further includes a mechanical transmission operated in parallel with a hydrostatic transmission, and the mechanical transmission has a plurality of discrete gear ratios, each of the plurality of discrete gear ratios being associated with one of the plurality of speed modes.

8. The powertrain control system of claim 1, further including a speed sensor disposed on the CVT, the speed sensor being configured to measure a CVT output speed, and the controller being configured to calculate the ground speed based on the CVT output speed.

9. A machine, comprising:
a power source;
a traction device;
a CVT including a mechanical transmission and a hydrostatic transmission, the CVT coupled to transmit output of the power source to the traction device;
a speed sensor located on an output of the CVT, the speed sensor being configured to measure a CVT output speed; and
a controller in communication with the power source and the CVT, wherein the controller includes a map with a plurality of speed modes including at least a first speed mode, a second speed mode, and a third speed mode, the controller being configured to transition from the first speed mode to the second speed mode as a result of a CVT output speed exceeding a threshold speed, the map including a power source speed limit for the plurality of speed modes, wherein the power source speed limit of the first speed mode varies as a function of CVT output speed for a constant machine load,
the power source speed limit of the first speed mode for a constant machine load having:
a first value at zero CVT output speed, and
a second value at a CVT output speed greater than zero, wherein the first value is greater than the second value, and
wherein the controller is configured to scale the power source speed limit up based on an increase in the machine load, and
wherein for the third speed mode, the controller is configured to increase an actual power source speed directly as a function of an increase in the CVT output speed.

10. The machine of claim 9, wherein the map includes a power source speed limit for each of the plurality of speed modes.

11. The machine of claim 10, wherein for the first speed mode, the controller is configured to:
allow direct modulation of the actual power source speed up to the power source speed limit via an operator input device.

12. The machine of claim 11, wherein an entire power source speed limit curve scales down based on a decrease in the machine load.

13. The machine of claim 10, wherein the first speed mode is a low-speed mode, the second speed mode is a mid-speed mode, and the third speed mode is a high-speed mode, the power source speed limit of the low speed mode decreasing as a function of ground speed, wherein the power source speed limit of the mid-speed mode is constant as a function of ground speed.

14. A powertrain control system associated with an engine and a CVT coupled to an output of the engine, comprising:
a controller in communication with the engine and the CVT, wherein the controller includes a map with a plurality of speed modes including a first speed mode and a second speed mode, the controller being configured to transition from the first speed mode to the second speed mode when a ground speed exceeds a threshold speed, the map including a power source speed limit for the plurality of speed modes, wherein the power source speed limit of the first speed mode varies as a function of ground speed for a constant machine load,
the engine speed limit of the first speed mode for a constant machine load having:
a first value at zero ground speed, and
a second value at a ground speed greater than zero, wherein the first value is greater than the second value,
wherein the controller is configured to scale the power source speed limit up based on an increase in the machine load,
and wherein for the first speed mode the controller is configured to allow direct modulation of the actual engine speed up to, but not above, the power source speed limit via an operator input device.

15. The powertrain control system of claim 14, wherein the map includes an engine speed limit for each of the plurality of speed modes, the plurality of speed modes further including a third speed mode.

16. The powertrain control system of claim 15, wherein the engine speed limit of the third speed mode increases as a function of increasing ground speed at a constant machine load.

17. The powertrain control system of claim 16, wherein the operator input device is configured to control an output torque of the CVT when the controller implements the third speed mode.

18. The powertrain control system of claim 17, wherein the CVT further includes a mechanical transmission operated in parallel with a hydrostatic transmission, and the mechanical transmission has a plurality of discrete gear ratios, each of the plurality of discrete gear ratios being associated with one of the plurality of speed modes.

19. The powertrain control system of claim 18, further including a speed sensor disposed on the CVT, the speed sensor being configured to measure the CVT output speed.

20. The powertrain control system of claim 19, wherein the controller is configured to calculated the ground speed based on the CVT output speed.

* * * * *